United States Patent
Acar et al.

(10) Patent No.: US 7,661,652 B2
(45) Date of Patent: Feb. 16, 2010

(54) ELECTROMAGNETICALLY ACTUATABLE VALVE

(75) Inventors: Sezgin Acar, Ludwigsburg (DE); Jens Kolarsky, Bietigheim/Bissingen (DE); Boris Buchtala, Muehlacker (DE); Erich Ludewig, Bietighiem-Bissingen (DE); Dietmar Sommer, Sachsenheim (DE); Massimiliano Ambrosi, Marbach (DE); Valentin Schubitschew, Asperg (DE); Ingo Buchenau, Steinheim (DE); Rafael Gonzalez Romero, Ilsfeld-Auenstein (DE); Dietmar Kratzer, Tamm (DE); Michael Hilden, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 522 days.

(21) Appl. No.: 11/576,733

(22) PCT Filed: Sep. 21, 2005

(86) PCT No.: PCT/EP2005/054729

§ 371 (c)(1),
(2), (4) Date: Apr. 5, 2007

(87) PCT Pub. No.: WO2006/040248

PCT Pub. Date: Apr. 20, 2006

(65) Prior Publication Data

US 2008/0093573 A1    Apr. 24, 2008

(30) Foreign Application Priority Data

Oct. 7, 2004    (DE) ................. 10 2004 048 861

(51) Int. Cl.
*F16K 31/02* (2006.01)
(52) U.S. Cl. ............................ 251/129.15; 137/599.01
(58) Field of Classification Search ............ 251/129.01, 251/129.15; 137/599.01
See application file for complete search history.

(56) References Cited

U.S. PATENT DOCUMENTS

| 6,302,499 | B1  | 10/2001 | Linkner, Jr. et al. |
| 6,637,724 | B1  | 10/2003 | Mayer |
| 6,749,175 | B2* | 6/2004  | Sato et al. ............... 251/129.19 |
| 6,854,707 | B2* | 2/2005  | Miyazoe ................. 251/129.15 |
| 7,344,119 | B2* | 3/2008  | Tsuchizawa et al. ... 251/129.15 |
| 2004/0089832 | A1 | 5/2004 | Wilde et al. |

FOREIGN PATENT DOCUMENTS

| EP | 1 118 518 A2 | 7/2001 |
| WO | WO 02/12039 A1 | 2/2002 |

* cited by examiner

*Primary Examiner*—John K Fristoe, Jr.
(74) *Attorney, Agent, or Firm*—Ronald E. Greigg

(57) ABSTRACT

An electromagnetically actuatable valve for brake systems in motor vehicles, comprises a hydraulic part and an electric part. The valve is partially placed inside a valve block, in which an inlet borehole and an outlet borehole for a hydraulic fluid are made. The hydraulic part comprises a valve element inside of which a transversal borehole is made that communicates with the inlet borehole. In addition, a number of longitudinal boreholes, which are connected to the outlet borehole, are made in the valve element. The transversal borehole and the longitudinal boreholes are connected via a closing element. The valve enables a controlled opening and closing of the closing element thereby making a low-noise switching of the valve possible.

20 Claims, 3 Drawing Sheets

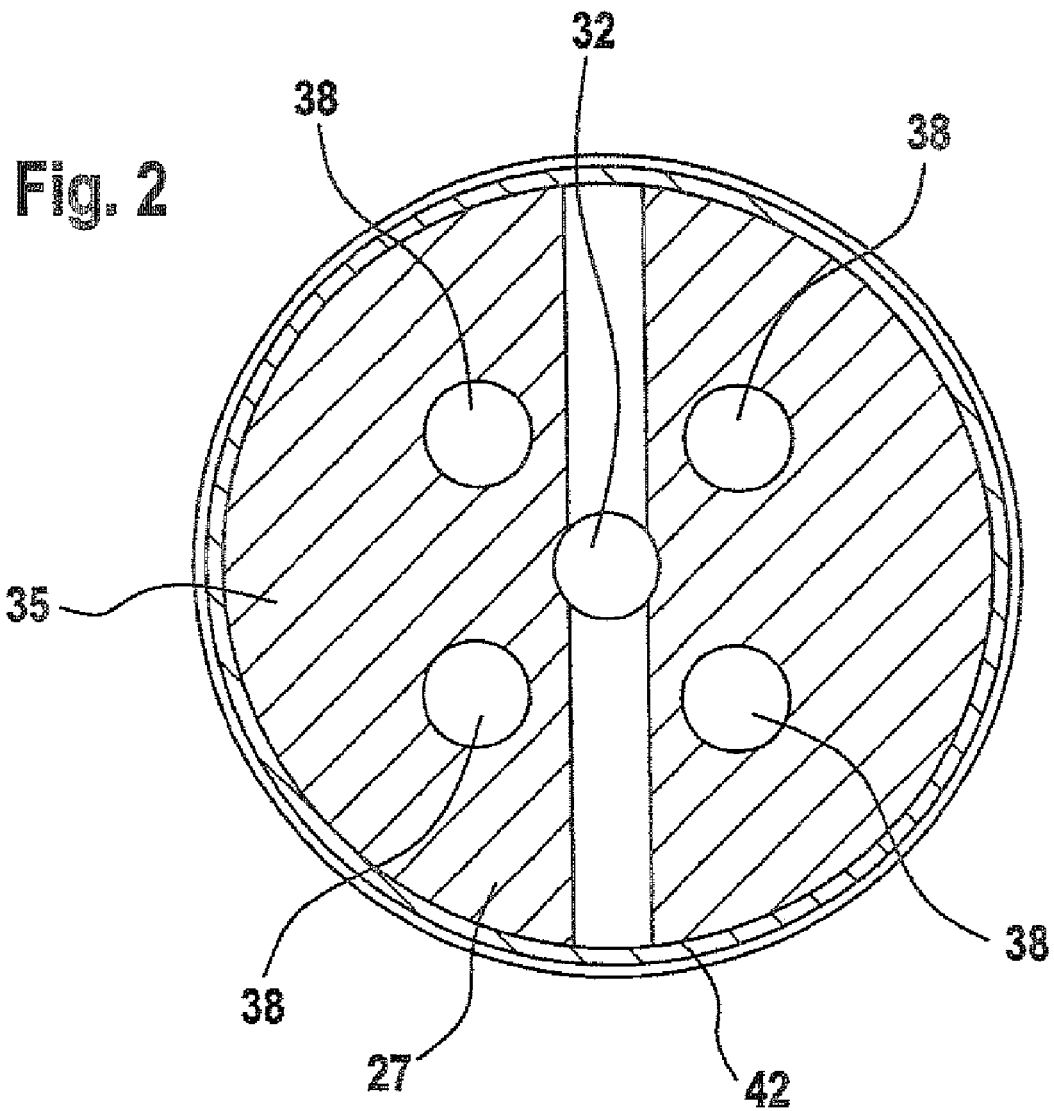

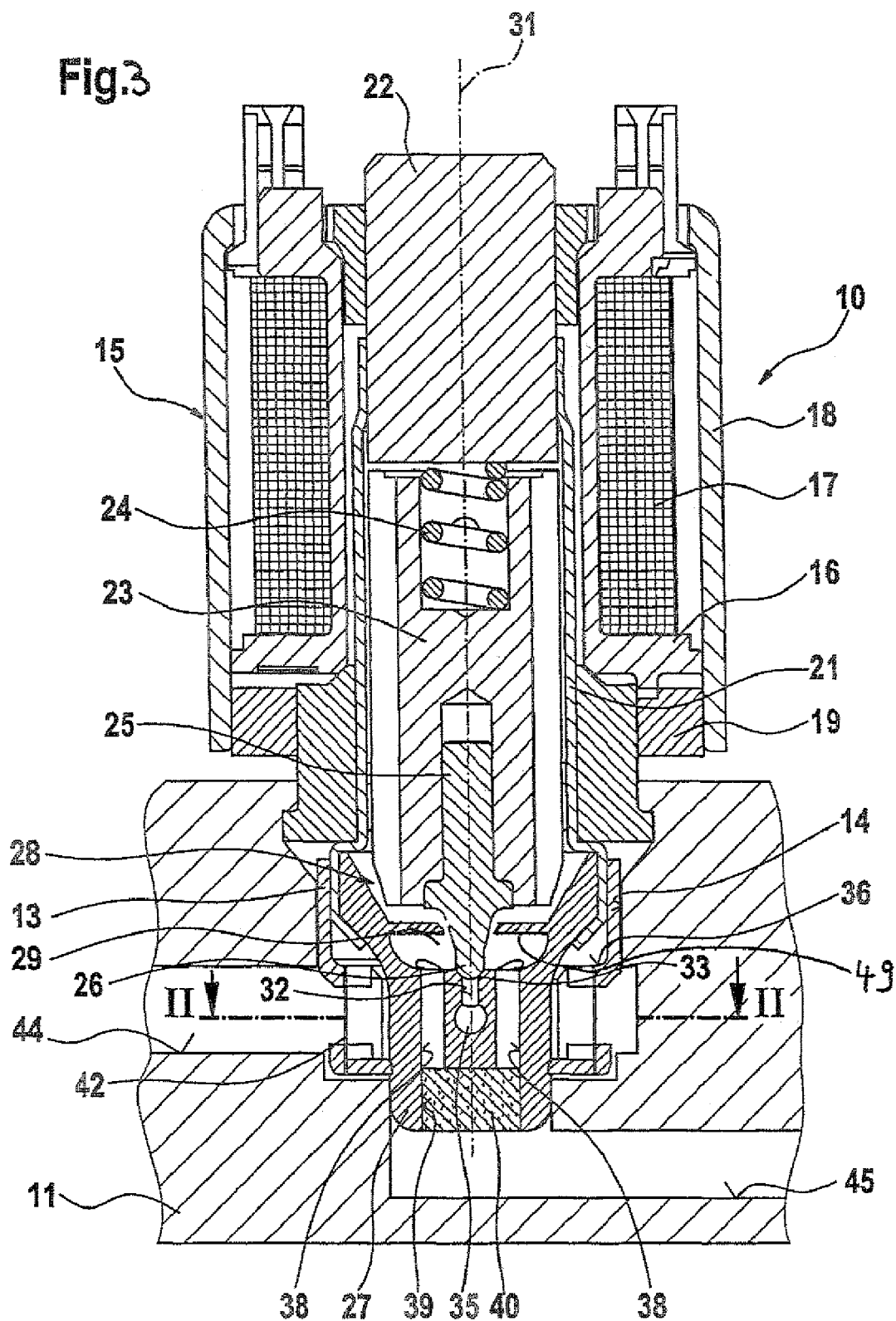

ELECTROMAGNETICALLY ACTUATABLE VALVE

CROSS-REFERENCE TO RELATED APPLICATION

This application is a 35 USC 371 application of PCT/EP 2005/054729 filed on Sep. 21, 2005.

BACKGROUND OF THE INVENTION

1. Field of the Invention

The invention relates to an improved electromagnetically actuatable valve, in particular for brake systems in motor vehicles.

2. Description of the Prior Art

One valve known from European Patent Disclosure EP 1 307 369 B1 is disposed in a valve block as a switching member between a wheel brake cylinder and a fluid reservoir and serves to allow pressurized medium from the wheel brake cylinder to flow out in the direction of the fluid reservoir. For the sake of optimizing the installation space for the valve block, the inlet bore and the return bore for the pressure fluid are disposed in the valve block, and thus also in the valve, perpendicular to the longitudinal axis of the valve. As a consequence, the inflow of pressure fluid from the wheel brake cylinder takes place perpendicular to the longitudinal axis of the tappet element. In this known valve, the pressure fluid acts hydraulically in the same direction of operation as a compression spring that presses the tappet element in the direction of a sealing seat. It has been demonstrated that in particular the transition from the closed to the opened valve and vice versa is associated with noise, because of flow conditions. Because of the force of the pressure fluid acting hydraulically in the same direction as the compression spring, it is not possible in the known valve, with the predetermined magnetic circuit, to control the opening and closing process of the valve in a desired way in order to minimize noise production.

SUMMARY AND ADVANTAGES OF THE INVENTION

The electromagnetically actuatable valve of the invention, particularly for brake systems in motor vehicles, has the advantage that the opening and closing process of the valve can be triggered at relatively little expense from the magnet standpoint. According to the invention, this is essentially attained in that the pressure fluid flowing in from the inlet bore now acts on the valve seat in a direction opposite the compression spring, and as a result the motion of the tappet in the opening process can be varied or controlled substantially better by means of the predetermined magnetic circuit. The proposed valve is furthermore compatible in terms of its connections with the previous valve; that is, the same valve blocks with the same geometry of the inlet and return bores for the pressure fluid can be employed.

In an expedient refinement, the valve element has an impact face, so that the fluid stream emerging from the sealing region no longer acts directly on the armature and the valve closing element. As a result, unwanted fluctuations in the hydraulic force can be lessened which has a favorable effect on the stability and regulatability of the valve.

Advantageous refinements of the electromagnetically actuatable valve are disclosed.

BRIEF DESCRIPTION OF THE DRAWINGS

One exemplary embodiment of the invention is described more fully herein below, with reference to the drawings, in which:

FIG. 2 is a section in the plane II-II of FIG. 1 in the region of the inlet bore, which cooperates with the valve seat; and FIG. 3 is a longitudinal section through an alternative version of an electromagnetically actuatable valve.

DESCRIPTION OF THE PREFERRED EMBODIMENTS

Figure 1:
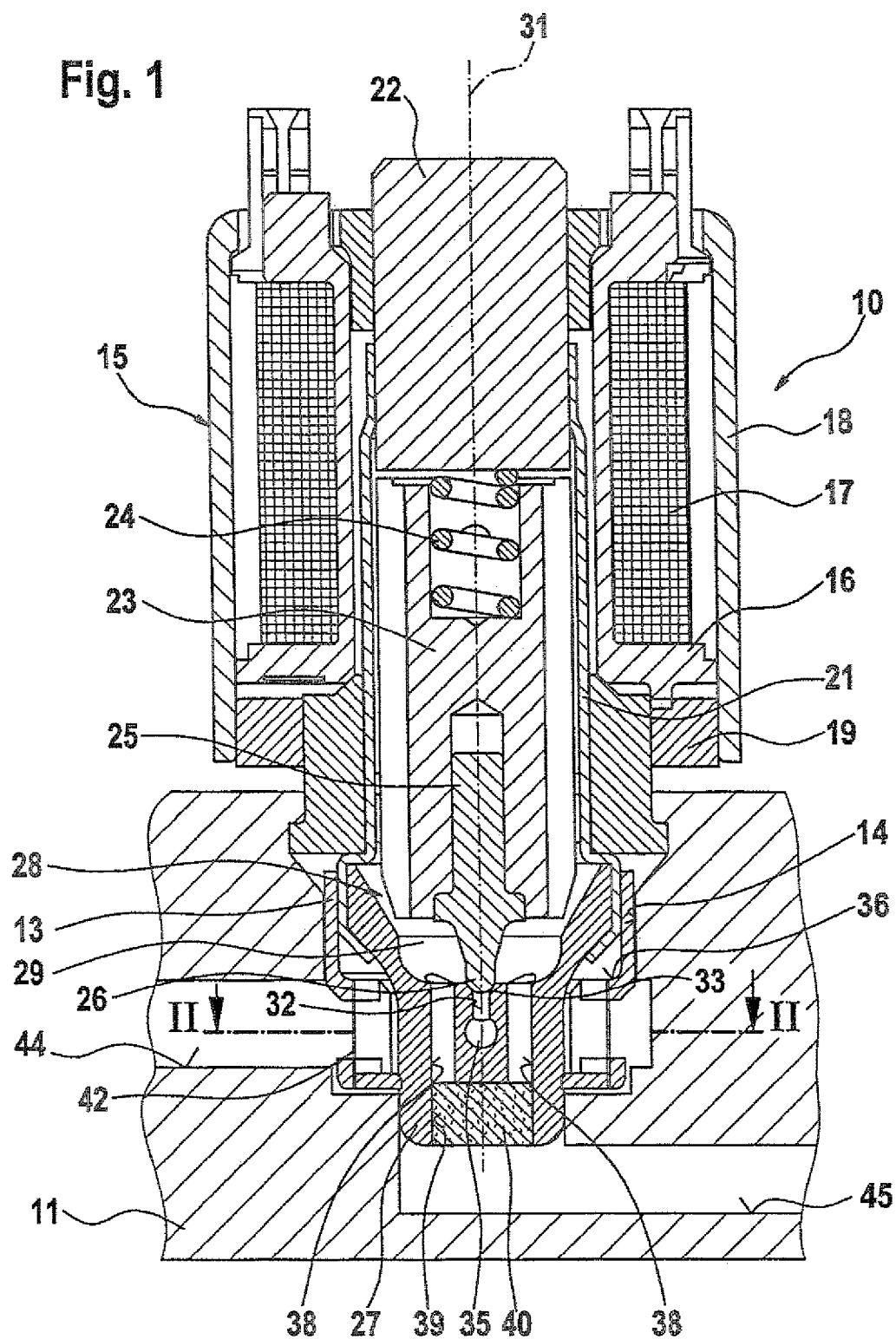
FIG. 1 shows a longitudinal section through an electromagnetically actuatable valve which is disposed in a valve block.

The electromagnetically actuatable valve 10 shown in FIG. 1 is disposed in part in or on a valve block 11 and forms part of a pressure control device, not otherwise shown, for a brake system of a motor vehicle.

The valve 10, which is closed when without current, comprises two component groups: a hydraulic part 13, which is received in part in a stepped bore 14 in the valve block 11, and an electric part 15, which is slipped onto the hydraulic part 13 that protrudes from the valve block 11. The electric part 15 substantially comprises a coil body 16 with an electrical winding 17, a coil jacket 18 that conducts magnetic flux, and an annular disk 19 that conducts magnetic flux.

The hydraulic part 13 of the valve 10 has a guide sleeve 21, which is closed on its end toward the electric part 15 by a pole core 22 that is press-fitted in and is welded in fluid-tight fashion. A longitudinally displaceable armature 23 is received in the guide sleeve 21. The armature 23 is braced on the pole core 22 by a restoring spring 24. Remote from the pole core in the armature 23, a substantially pinlike closing member 25 with a hemispherical end 26 is press-fitted into a blind bore.

The guide sleeve 21 is connected to a sleevelike valve element 27 by crimping. The valve element 27, on the side toward the armature 23, has a funnel-like widened region 28, into which the armature 23 protrudes with its closing member 25. Thus an annular chamber 29 is embodied in the valve element 27, between the valve element 27 and the armature 23.

In the longitudinal axis 31 of the valve 10, in which axis the armature 23 and the valve element 27 are also disposed, a blind-borelike longitudinal bore 32 is embodied in the valve element 27, on the side toward the closing member 25. In its outlet region, the longitudinal bore 32 has an indentation 33, which together with the end 26 of the closing member 25 forms a sealing seat, when the closing member 25 is pressed by the restoring spring 24 in the direction of the valve element 27. A transverse bore 35 originates at the bottom of the longitudinal bore 32 and leads as far as the outer circumference of the valve element 27.

A plurality of longitudinal bores 38, in the exemplary embodiment four of them, disposed at equal angular spacings originate at the bottom 36 of the region 28 of the valve element 27. The longitudinal bores 38 discharge on the side of the valve element 27 diametrically opposite the indentation 33. A filter element 40 is inserted there in a bore 39. The valve element 27 described thus far is preferably produced from an injection-molded or sintered metal, and as a result the possibility is obtained of producing the valve element 27 without metal-cutting machining.

The valve element 27 and the region of the guide sleeve 21 that surrounds the valve element 27 are surrounded by an annular filter element 42. The filter element can experience a flow through it of pressure fluid radially, and a communication exists between the filter element 42 and the transverse bore 35 in the valve element 27.

The valve 10 described thus far is inserted with its valve element 27 and its filter element 42 into the stepped bore 14 of the valve block 11. An inlet bore 44, which is coupled for instance to a wheel brake cylinder, discharges into the stepped bore 14 at the level of the filter element 42 or transverse bore 35. An outlet bore 45, which communicates with the longitudinal bores 38 via the filter element 40, is disposed parallel, but on the diametrically opposite side of the inlet bore 44.

In the state when the valve 10 is without current, the restoring spring 24 presses the closing member 25 against the indentation 33 in the valve element 27, so that via the inlet bore 44 and the filter element 42, pressure fluid under pressure in the transverse bore 35 and the longitudinal bore 32 cannot flow out via the sealing seat at the end 26 of the closing member 25.

Supplying current to the valve 10 causes the armature 23 to move in the direction of the pole core 22, so that the closing member 25 lifts from the valve element 27. This in turn causes an overflow of pressure fluid via the transverse bore 35 and the longitudinal bore 32 into the chamber 29, and from there into the outlet bore 45, via the longitudinal bores 38 in the valve element 27 and via the filter element 40.

Because the pressure fluid in the longitudinal bore 32 exerts a hydraulic force on the closing member 25 that acts counter to the spring force of the restoring spring 24, and thus when current supplied reinforces the motion of the armature 23, a targeted motion of the closing member 25 can be accomplished with relatively slight magnetic forces. The stroke can thus be varied in manifold ways over the opening or closing time so that depending on the specific application, the flow conditions at the valve 10 can be designed in such a way that the quietest possible opening and closing process of the valve 10 can be achieved.

The alternative exemplary embodiment shown in FIG. 3 corresponds substantially to that of FIG. 1, but the valve element 27 additionally has an impact face 49, extending radially into the chamber 29. Thus the fluid stream emerging from the sealing region no longer directly strikes the armature 23, but rather the impact face 49. The impact face 49 has a hole in the center, in which hole the closing member 25 is seated movably. Fluctuations in the pressure and speed of the free stream emerging downstream of the valve seat lead directly to fluctuations in the hydraulic force (fluctuations of the kind in question here can be caused for instance by pressure surges or cavitation and are therefore unavoidable). The unwanted fluctuation in the hydraulic force interferes with the equilibrium, required for the stability of the valve 10, of the hydraulic force, magnetic force, and spring force. The result is vibration, which in the least favorable case leads to the loss of the regulatability. The impact face 49 absorbs this interference to a certain extent and as a result increases the robustness, making for better regulatability of the valve 10.

If vibration of the armature 23 occurs in the valve 10, then because of mass inertia, fluid must necessarily flow through the annular gap between the impact face 49 and the closing member 25. The area of the annular gap is determined by the size of the hole in the center of the impact face and by the diameter of the closing member 25 at the point of passage. If this gap area is small enough, the resultant flow resistance has a damping effect on the system and is thus dynamically stabilizing. The degree of damping can be determined by the size of the gap.

The impact face 49 is embodied such that it promotes the flow deflection downward toward the outflow conduits 38. As a result, for a given pressure difference, the flow via the valve 10 increases.

Since the valve element 27 can preferably be produced from an injection-molded or sintered metal without metal-cutting machining, the shaping is quite variable. In particular, design-related provisions can used to optimize the flow course around the armature 23 and the closing member 25.

The foregoing relates to a preferred exemplary embodiment of the invention, it being understood that other variants and embodiments thereof are possible within the spirit and scope of the invention, the latter being defined by the appended claims.

The invention claimed is:

1. In an electromagnetically actuatable valve for brake systems in motor vehicles, which is disposed in a valve block that has an inlet bore and a return bore, having a valve element disposed in the valve block and a valve seat cooperating with a valve closing element, the valve closing element being movable by means of an armature and pressed against the valve seat by a compression spring, and the inlet bore communicates with the valve element via at least one transverse bore disposed transversely to the longitudinal axis of the valve, the improvement wherein the transverse bore in the valve element cooperates with a longitudinal bore opening into the valve seat and disposed on the side of the valve closing element diametrically opposite the compression spring; and wherein the valve element has at least one outflow conduit, which communicates with the return bore and which when the valve closing element is lifted from the valve seat communicates with the transverse bore via the longitudinal bore.

2. The valve as defined by claim 1, wherein that the valve clement, in the region of the valve closing element, comprises an annular overflow chamber, from the bottom of which the at least one outflow conduit originates.

3. The valve as defined by claim 2, wherein the at least one outflow conduit discharges, on the side toward the return bore, into a filter element disposed in the valve element.

4. The valve as defined by claim 3, further comprising means for varying the flow course around the armature and the valve closing element.

5. The valve as defined by claim 4, wherein the means for varying the flow course are embodied as an impact face.

6. The valve as defined by claim 2, further comprising means for varying the flow course around the armature and the valve closing element.

7. The valve as defined by claim 6, wherein the means for varying the flow course are embodied as an impact face.

8. The valve as defined by claim 1, wherein the at least one outflow element comprises a plurality of outflow conduits, disposed at equal angular spacings from one another in the valve element.

9. The valve as defined by claim 8, further comprising means for varying the flow course around the armature and the valve closing element.

10. The valve as defined by claim 9, wherein the means for varying the flow course are embodied as an impact face.

11. The valve as defined by claim 1, wherein the valve element is embodied as a component produced without metal-cutting machining.

12. The valve as defined by claim 1, further comprising means for varying the flow course around the armature and the valve closing element.

13. The valve as defined by claim 12, wherein the means for varying the flow course are embodied as an impact face.

14. The valve as defined by claim 13, wherein the means for varying the flow course are embodied as part of the valve element.

15. The valve as defined by claim 13, wherein the means for varying the flow course are disposed in the flow region between the armature and at least one outflow conduit.

16. The valve as defined by claim 12, wherein the means for varying the flow course are embodied as part of the valve element.

17. The valve as defined by claim 16, wherein the means for varying the flow course annularly surround the valve closing element.

18. The valve as defined by claim 17, wherein the means for varying the flow course are disposed in the flow region between the armature and at least one outflow conduit.

19. The valve as defined by claim 16, wherein the means for varying the flow course are disposed in the flow region between the armature and at least one outflow conduit.

20. The valve as defined by claim 12, wherein the means for varying the flow course are disposed in the flow region between the armature and at least one outflow conduit.

* * * * *